United States Patent
Kimura et al.

(10) Patent No.: US 10,900,544 B2
(45) Date of Patent: Jan. 26, 2021

(54) TENSIONER WITH STIFFNESS CONTROLLABLE CHECK VALVE

(71) Applicant: BorgWarner Inc., Auburn Hills, MI (US)

(72) Inventors: Toshinobu Kimura, Sakurai (JP); Jeremy Benn, Baldwinsville, NY (US); Toru Shinoyama, Yamatokoriyama (JP)

(73) Assignee: BorgWarner Inc., Auburn Hills, MI (US)

(*) Notice: Subject to any disclaimer, the term of this patent is extended or adjusted under 35 U.S.C. 154(b) by 274 days.

(21) Appl. No.: 16/009,394

(22) Filed: Jun. 15, 2018

(65) Prior Publication Data

US 2018/0363740 A1     Dec. 20, 2018

Related U.S. Application Data

(60) Provisional application No. 62/520,481, filed on Jun. 15, 2017.

(51) Int. Cl.
*F16H 7/08* (2006.01)
*F16K 15/02* (2006.01)

(52) U.S. Cl.
CPC ......... *F16H 7/0848* (2013.01); *F16K 15/028* (2013.01); *F16H 2007/0806* (2013.01);
(Continued)

(58) Field of Classification Search
CPC ........... F16H 7/0848; F16H 2007/0812; F16H 2007/0814; F16H 2007/0859;
(Continued)

(56) References Cited

U.S. PATENT DOCUMENTS

| 976,010 A | 11/1910 | Thompson |
| 979,811 A | 12/1910 | Wallem |

(Continued)

FOREIGN PATENT DOCUMENTS

| DE | 102009049245 A1 | 5/2010 |
| EP | 0645289 A2 | 3/1995 |

(Continued)

OTHER PUBLICATIONS

International Search Report for PCT/US2017/047101 dated Nov. 27, 2017.

(Continued)

*Primary Examiner* — Michael R Mansen
*Assistant Examiner* — Raveen J Dias
(74) *Attorney, Agent, or Firm* — Brown & Michaels, PC

(57) ABSTRACT

A hydraulic tensioner for an internal combustion engine for tensioning a span of a chain or a belt has a piston with an internal reservoir connected to a high pressure chamber through a check valve assembly. The check valve assembly has a disk seat received within the hollow bore of the body of the piston having at least one passage connecting the internal reservoir to the hydraulic pressure chamber; a check valve retainer coupled to the disk seat; a check valve disk received between the disk seat and the check valve retainer moveable between a first position and a second position, and a check valve spring received between the check valve disk and the check valve retainer.

8 Claims, 12 Drawing Sheets

(52) U.S. Cl.
CPC ........... *F16H 2007/0808* (2013.01); *F16H 2007/0812* (2013.01); *F16H 2007/0814* (2013.01); *F16H 2007/0859* (2013.01)

(58) Field of Classification Search
CPC ..... F16H 2007/0893; F16H 2007/0895; F16H 2007/0897; F16H 2007/0889; F16H 7/08; F16H 2007/0806; F16H 2007/0808; F16H 2007/0829; F16H 7/0834; F16H 7/0836; F16H 2007/084; F16H 2007/0853; F16K 15/028
See application file for complete search history.

(56) References Cited

U.S. PATENT DOCUMENTS

| | | | |
|---|---|---|---|
| 1,613,145 A | 1/1927 | Trump | |
| 1,682,602 A | 8/1928 | Dawley | |
| 1,915,694 A | 6/1933 | Reindel | |
| 2,167,721 A | 8/1939 | La Brie | |
| 2,273,737 A | 2/1942 | Snyder | |
| 2,308,876 A | 1/1943 | Hammett | |
| 2,767,733 A | 10/1956 | Anderson | |
| 2,853,159 A | 9/1958 | Kuhn | |
| 2,908,109 A | 10/1959 | Rotwein | |
| 2,960,109 A | 11/1960 | Wilson | |
| 3,169,548 A | 2/1965 | Mcintosh | |
| 3,269,409 A | 8/1966 | Ansell | |
| 3,304,952 A | 2/1967 | Krone | |
| 3,415,272 A | 12/1968 | Blackhawk et al. | |
| 3,437,065 A | 4/1969 | Robbins | |
| 3,536,094 A | 10/1970 | Manley | |
| 3,719,401 A | 3/1973 | Peruglia | |
| 3,913,322 A | 10/1975 | Over et al. | |
| 4,018,247 A | 4/1977 | Carr | |
| 4,237,935 A | 12/1980 | Delmonte et al. | |
| 4,253,524 A | 3/1981 | Erickson | |
| 4,278,106 A | 7/1981 | Cunningham | |
| 4,507,103 A | 3/1985 | Mittermeier | |
| 4,526,195 A | 7/1985 | Humphrey et al. | |
| 4,628,957 A | 12/1986 | Hofer | |
| 4,648,369 A | 3/1987 | Wannenwetsch | |
| 4,772,251 A * | 9/1988 | Goppelt | F16H 7/08 474/101 |
| 4,792,322 A * | 12/1988 | Goppelt | F16H 7/08 474/136 |
| 4,940,447 A | 7/1990 | Kawashima et al. | |
| 5,183,075 A | 2/1993 | Stein | |
| 5,271,429 A | 12/1993 | Bauer et al. | |
| 5,346,436 A | 9/1994 | Hunter et al. | |
| 5,406,976 A | 4/1995 | Bekki | |
| 5,449,018 A | 9/1995 | Harris | |
| 5,469,883 A | 11/1995 | Lee | |
| 5,511,583 A | 4/1996 | Bassett | |
| 5,637,047 A * | 6/1997 | Schulze | F16H 7/0848 474/110 |
| 5,655,567 A | 8/1997 | Mikel | |
| 5,700,213 A | 12/1997 | Simpson et al. | |
| 5,707,309 A | 1/1998 | Simpson | |
| 5,819,794 A | 10/1998 | Anderson | |
| 5,879,256 A | 3/1999 | Tada | |
| 5,924,438 A | 7/1999 | Cimminelli et al. | |
| 5,967,920 A | 10/1999 | Dembosky et al. | |
| 5,993,341 A | 11/1999 | Anderson | |
| 6,142,168 A | 11/2000 | Sumrall | |
| 6,193,623 B1 | 2/2001 | Koch et al. | |
| 6,298,873 B1 | 10/2001 | LeVey et al. | |
| 6,361,458 B1 | 3/2002 | Smith | |
| 6,383,103 B1 * | 5/2002 | Fujimoto | F01L 1/02 474/109 |
| 6,435,993 B1 | 8/2002 | Tada | |
| 6,510,868 B2 | 1/2003 | Penza | |
| 6,537,043 B1 | 3/2003 | Chen | |
| 6,575,192 B1 | 6/2003 | Shaffer | |
| 6,581,632 B2 | 6/2003 | Walpole et al. | |
| 6,592,479 B2 * | 7/2003 | Nakakubo | F16H 7/0848 474/109 |
| 6,716,124 B2 | 4/2004 | Markley | |
| 6,811,505 B2 | 11/2004 | Hashimoto et al. | |
| 7,028,708 B1 | 4/2006 | Langenfeld et al. | |
| 7,108,621 B2 | 9/2006 | Ullein et al. | |
| 7,174,799 B2 | 2/2007 | Yoshida et al. | |
| 7,258,134 B1 | 8/2007 | Langenfeld | |
| 7,367,353 B1 | 5/2008 | Langenfeld et al. | |
| 7,404,776 B2 | 7/2008 | Yoshida | |
| 7,427,249 B2 | 9/2008 | Yoshida | |
| 7,568,497 B1 | 8/2009 | Langenfeld et al. | |
| 7,618,339 B2 * | 11/2009 | Hashimoto | F01L 1/02 474/109 |
| 7,775,921 B2 | 8/2010 | Izutsu et al. | |
| 7,775,924 B2 | 8/2010 | Koch | |
| 7,913,715 B2 | 3/2011 | Martin | |
| 8,002,656 B2 | 8/2011 | Emizu et al. | |
| 8,137,224 B2 * | 3/2012 | Emizu | F16H 7/0836 474/110 |
| 8,403,783 B2 | 3/2013 | Wigsten | |
| 8,574,106 B2 | 11/2013 | Botez | |
| 8,585,519 B2 | 11/2013 | Hartmann | |
| 8,951,154 B2 | 2/2015 | Konuma | |
| 9,309,878 B2 | 4/2016 | Columpsi | |
| 9,765,770 B2 | 9/2017 | Babbini et al. | |
| 2001/0032675 A1 | 10/2001 | Russell | |
| 2002/0022541 A1 | 2/2002 | Ullein et al. | |
| 2002/0098932 A1 | 7/2002 | Hashimoto et al. | |
| 2003/0008738 A1 | 1/2003 | Rossato et al. | |
| 2003/0125143 A1 | 7/2003 | Seungpyo | |
| 2004/0154666 A1 | 8/2004 | Gessat et al. | |
| 2004/0214671 A1 * | 10/2004 | Clayton | F16H 7/0848 474/110 |
| 2004/0266572 A1 | 12/2004 | Yoshida | |
| 2005/0064969 A1 | 3/2005 | Tomita et al. | |
| 2005/0227799 A1 | 10/2005 | Yoshida | |
| 2006/0063625 A1 | 3/2006 | Emizu et al. | |
| 2006/0094549 A1 | 5/2006 | Yoshida et al. | |
| 2007/0044846 A1 | 3/2007 | Ashurst et al. | |
| 2008/0261737 A1 | 10/2008 | Yoshida et al. | |
| 2008/0289703 A1 * | 11/2008 | Penzone, Jr. | F16H 7/0848 137/539 |
| 2008/0293526 A1 | 11/2008 | Wigsten | |
| 2009/0197721 A1 | 8/2009 | Emizu et al. | |
| 2010/0004080 A1 | 1/2010 | He | |
| 2010/0090149 A1 | 4/2010 | Thompson et al. | |
| 2011/0015013 A1 * | 1/2011 | Hofmann | F16H 7/0848 474/110 |
| 2011/0237370 A1 * | 9/2011 | Hartmann | F16H 7/0836 474/110 |
| 2011/0263366 A1 | 10/2011 | Botez | |
| 2013/0017913 A1 | 1/2013 | Hartmann | |
| 2013/0313057 A1 | 11/2013 | Tsukahara | |
| 2014/0100068 A1 * | 4/2014 | Kurematsu | F16H 7/0836 474/110 |
| 2014/0256486 A1 | 9/2014 | Lunk et al. | |
| 2015/0267789 A1 * | 9/2015 | Kurematsu | F16H 7/08 474/110 |
| 2015/0292602 A1 * | 10/2015 | Kurematsu | F16H 7/0848 474/110 |
| 2015/0354674 A1 | 12/2015 | Markley et al. | |
| 2016/0186838 A1 * | 6/2016 | Kurematsu | F16H 7/08 474/110 |
| 2016/0290447 A1 * | 10/2016 | Kunimatsu | F16K 17/02 |
| 2016/0327135 A1 * | 11/2016 | Fischer | F16H 7/0836 |
| 2016/0356365 A1 * | 12/2016 | Crump | F16H 7/0848 |
| 2017/0130807 A1 * | 5/2017 | Kurematsu | F16H 7/0848 |
| 2017/0138443 A1 * | 5/2017 | Kurematsu | F16H 7/0848 |
| 2018/0087628 A1 * | 3/2018 | Maeda | F16H 7/0836 |
| 2018/0128354 A1 * | 5/2018 | Watanabe | F16H 9/26 |
| 2018/0274638 A1 * | 9/2018 | Watanabe | F16H 7/0848 |
| 2019/0107178 A1 * | 4/2019 | Yoshida | F16H 7/0848 |
| 2019/0128389 A1 * | 5/2019 | Ullein | F16H 7/08 |

(56) References Cited

U.S. PATENT DOCUMENTS

2019/0316657 A1* 10/2019 Cobb ..................... F16H 7/08
2019/0360559 A1* 11/2019 Sato ..................... F16H 7/08

FOREIGN PATENT DOCUMENTS

| | | |
|---|---|---|
| EP | 0919744 | 6/1999 |
| GB | 2410332 A | 7/2005 |
| JP | 2014077465 A | 5/2014 |
| JP | 2015183767 A | 10/2015 |
| JP | 2016121721 A | 7/2016 |
| KR | 20100091316 A | 8/2010 |
| KR | 20150096686 A | 8/2015 |
| KR | 20150141183 A | 12/2015 |
| WO | 2008027067 A1 | 3/2008 |
| WO | 2012106093 | 8/2012 |
| WO | 2012118723 | 9/2012 |
| WO | 2015048560 | 4/2015 |
| WO | 2015084592 | 6/2015 |
| WO | 2015110104 A1 | 7/2015 |
| WO | 2015116606 A1 | 8/2015 |

OTHER PUBLICATIONS

International Search Report for PCT/2016/030908 dated Aug. 16, 2016.
International Search Report for PCT/US2014/066496 dated Mar. 16, 2015.
International Search Report for PCT/US2018/019640 dated Nov. 26, 2018.

* cited by examiner

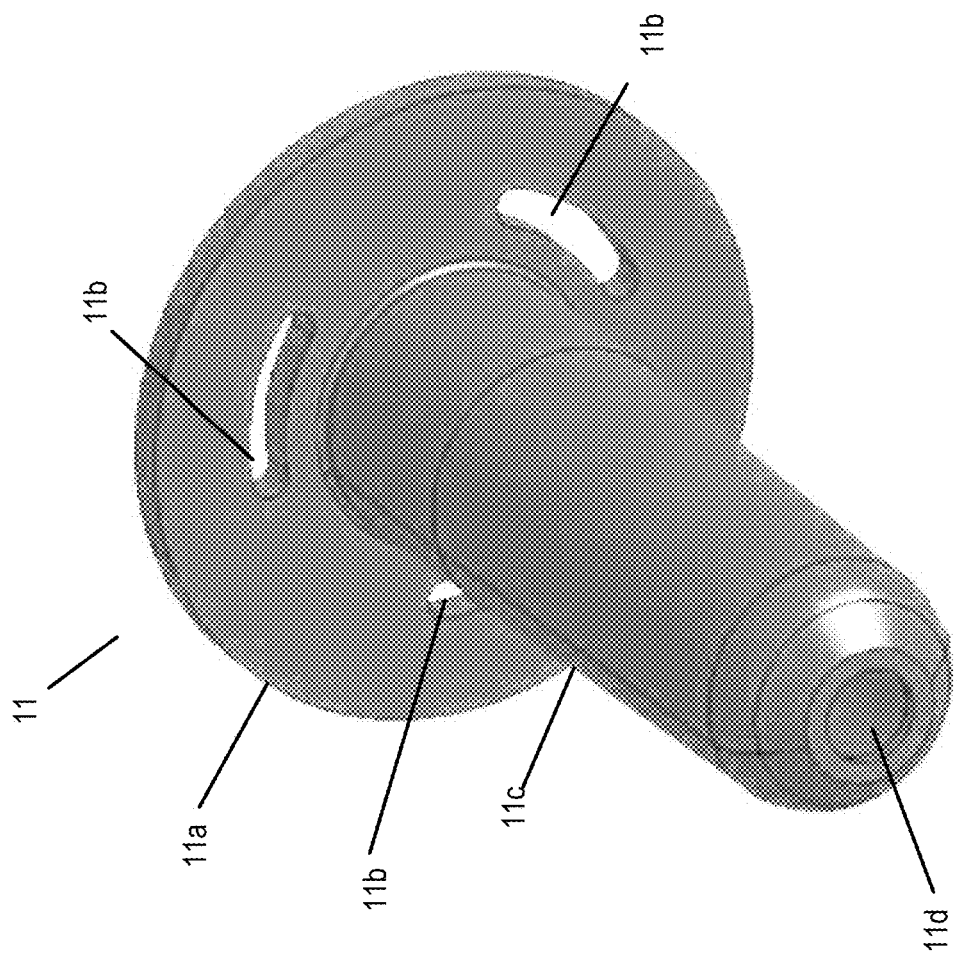
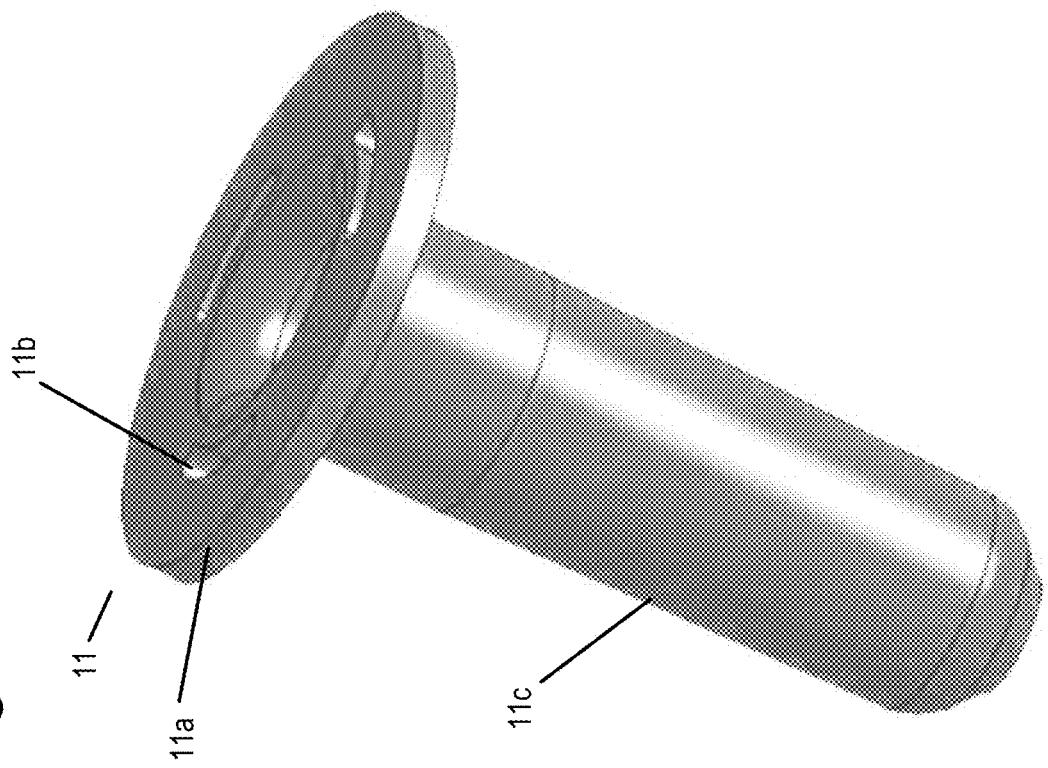

TENSIONER WITH STIFFNESS CONTROLLABLE CHECK VALVE

CROSS-REFERENCE TO RELATED APPLICATIONS

This application claims the benefit of U.S. patent application Ser. No. 62/520,481 filed on Jun. 15, 2017, the disclosure of which is herein incorporated by reference in its entirety.

BACKGROUND OF THE INVENTION

Field of the Invention

The invention pertains to the field of hydraulic tensioners. More particularly, the invention pertains to a hydraulic tensioner with a stiffness controllable check valve for an internal reservoir of the hydraulic tensioner.

Description of Related Art

Currently, hydraulic tensioners are required to have oil retention capabilities in order to reduce noise and vibration on the timing system of the internal combustion engine during engine start-up. Oil retention performance of hydraulic tensioners affects oil flow resistance in the hydraulic tensioner.

In conventional hydraulic tensioners, check valves are placed on the bottom of the open ended bore which receives the plunger, close to the inlet supply and in the high pressure chamber formed between the plunger of the tensioner and the bore of the tensioner housing.

SUMMARY OF THE INVENTION

A hydraulic tensioner for an internal combustion engine for tensioning a span of a chain or a belt has a piston with an internal reservoir connected to a high pressure chamber through a check valve assembly. The check valve assembly has a disk seat received within the hollow bore of the body of the piston having at least one passage connecting the internal reservoir to the hydraulic pressure chamber; a check valve retainer coupled to the disk seat; a check valve disk received between the disk seat and the check valve retainer moveable between a first position and a second position, and a check valve spring received between the check valve disk and the check valve retainer.

In a first position the check valve disk is biased against the disk seat by the check valve spring, sealing the at least one passage, preventing fluid from passing from the internal reservoir to the hydraulic pressure chamber. In a second position, the check valve disk is biased against the spring, such that fluid can flow from the internal reservoir to the high pressure chamber through the at least one passage of the disk seat.

When dynamic load from the chain or belt moves the piston inwards and outwards from the housing, fluid from the internal reservoir is drawn into the hydraulic pressure chamber through the at least one passage of the disk seat of the check valve assembly, increasing the fluid pressure within the hydraulic pressure chamber, exerting an outward force on the piston, opposing an inward force of the dynamic load from the chain or belt.

In one embodiment, the check valve assembly includes a pressure relief valve.

Unlike conventional tensioners, the check valve assembly of the present invention is placed within a transition diameter of the bore of the housing. The transition diameter is between a first diameter which has an internal reservoir and a second diameter which has a high pressure chamber and a spring. By placing the check valve assembly within the transition diameter between the internal reservoir and the high pressure chamber, the response time of the piston reaction force is improved, increasing the oil inflow volume to the internal reservoir, reducing oil flow resistance as compared to a conventional ball inlet check valve placed in the inlet of the internal reservoir.

BRIEF DESCRIPTION OF THE DRAWING

FIG. 8a shows a perspective view of the pressure relief valve body of FIG. 2.
FIG. 8b shows another perspective view of the pressure relief valve body of FIG. 2.

DETAILED DESCRIPTION OF THE INVENTION

Figure 1:
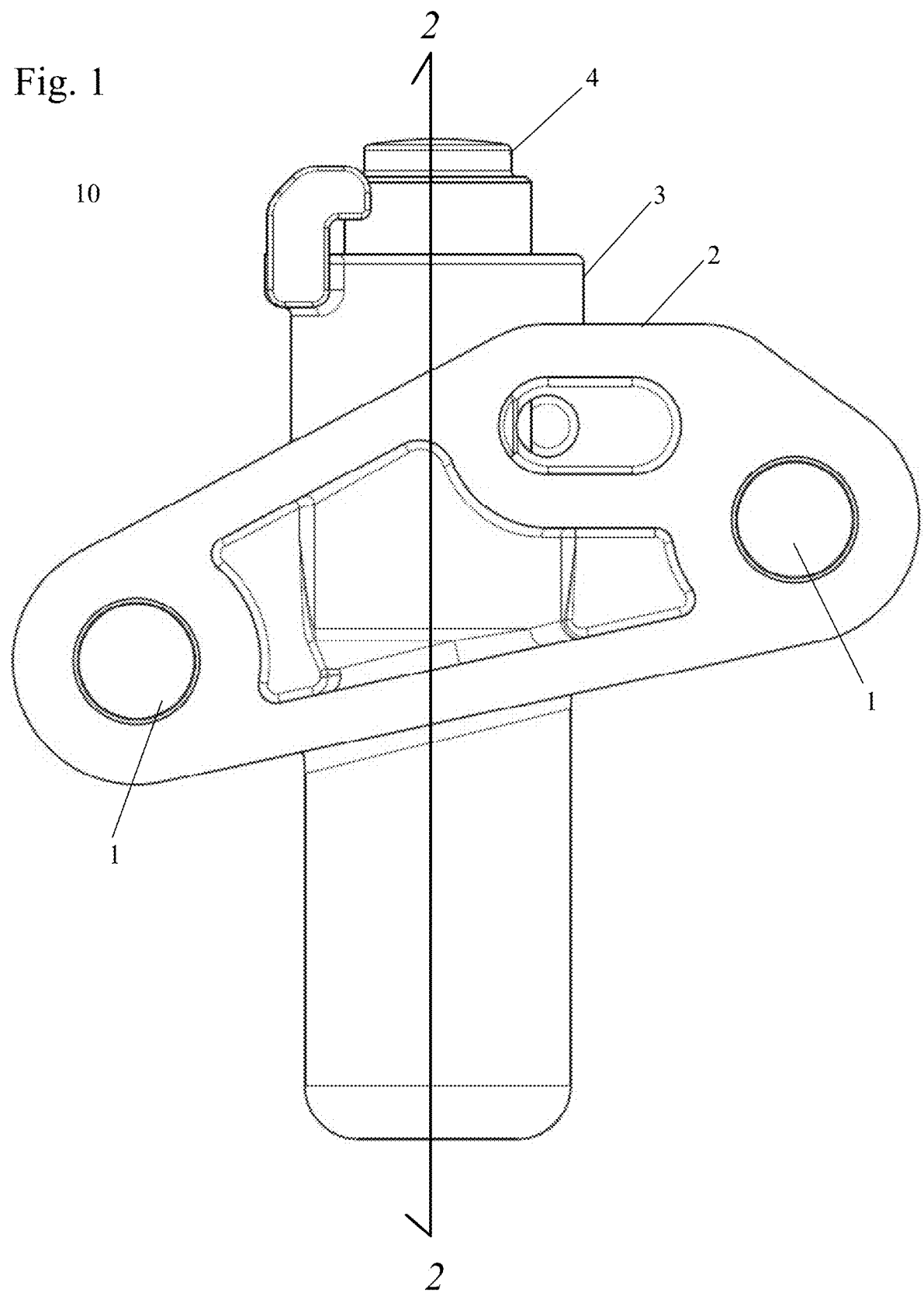
FIG. 1 shows a hydraulic tensioner of a first embodiment.

The hydraulic tensioner 10 of FIGS. 1-11 can be used for an endless loop, flexible, power transmission member for an internal combustion engine of a motor vehicle, such as a chain or belt. The power transmission member encircles a drive sprocket driven by a drive shaft, such as a crank shaft of the engine, and the at least one driven sprocket supported from a driven shaft, such as a cam shaft of the engine.

Referring to FIGS. 1-2, 5, and 7a-11, a first embodiment of a hydraulic tensioner 10 with an internal reservoir is shown. The hydraulic tensioner is mounted to an engine block of an internal combustion engine (not shown) via a mounting plate 2. The mounting plate 2 is secured to the engine block (not shown) via bolts or screws received in mounting plate holes 1. The mounting plate 2 is coupled to or formed in part with a tensioner housing 3. The tensioner housing 3 has a closed end multi-staged internal bore 3a. Between the closed end 21 of the bore 3a and the open end 22 of the bore 3a is an inlet portion 23 of the bore 3a which has a diameter d1, which is greater than the diameter d2 of the bore 3a at the closed end 21 and the open end 22 of the bore. An oil inlet 5 is present in the inlet portion 23 of the bore 3a and is in fluid communication with a fluid supply (not shown).

A hollow piston 4 is slidably received within the bore 3a of the housing 3. The hollow piston 4 has a body with a first end 4a, a second end 4b, and a length L between the first end 4a and the second end 4b. The first end 4a of the hollow piston 4 is in contact with a tensioner body, guide or endless loop, flexible, power transmission member for an internal combustion engine. The second end 4b of the hollow piston 4 is received within the bore 3a of the tensioner housing 3.

The hollow piston 4 has an internal bore 4c. The internal bore 4c has a first diameter D1, a second diameter D2, and a transition diameter D3 between the first diameter D1 and the second diameter D2. The first diameter D1 is preferably smaller than the second diameter D2. Along the length L of the hollow piston 4 is an inlet 4d which is in communication with the oil inlet 5.

A check valve assembly 20 is received within the transition diameter D3 of the internal bore 4c of the piston 4, dividing the internal bore 4c into an internal reservoir 6 and a high pressure chamber 8. The internal reservoir 6 is formed between the first diameter D1 of the internal bore 4c and the check valve assembly 20. The high pressure chamber 8 is formed between the check valve assembly 20, the second diameter D2 of the internal bore 4c of the piston 4, the second end 4b of the piston 4, and the closed end 21 of the bore 3a of the housing 3. A spring 7 is also preferably present within the high pressure chamber 8, with a first end 7a of the spring 7 biased against the check valve assembly 20 and the second end 7b of the spring 7 biased against the closed end 21 of the bore 3a of the housing 3, biasing the check valve assembly 20, and thus the piston 4 outwards and away from the closed end 21 of the bore 3a of the tensioner housing 3.

Within the internal bore 4c, a check valve assembly 20 is received within the transition diameter D3 and the second diameter D2 of the piston 4. Referring to FIGS. 5, and 7a-10, the check valve assembly 20 has a check valve portion and a pressure relief portion. The pressure relief valve is formed of a flange 11a coupled to a hollow, cylindrical pressure relief valve body 11c. The flange 11a of the pressure relief valve body 11c is preferably received by the transition diameter D3 with the remaining portion of the pressure relief valve body 11c extending into the second diameter D2. The flange 11a is preferably integrally formed with the cylindrical pressure relief valve body 11c. The flange 11a has a plurality of passages circumferentially arranged around the hollow, cylindrical pressure relief valve body 11c. The cylindrical pressure relief valve body 11c also has a vent opening 11d at an end.

Within the pressure relief valve body 11c, a moveable ball 12 is seated at the vent opening 11d. The ball 12 is moveable within the pressure relief valve body 11c by a pressure relief spring 13. A first end 13a of the pressure relief spring 13 is biased against a pressure relief valve retainer 14 and the second end 13b is biased against the ball 12. The pressure relief valve retainer 14 has a through passage 14a.

Surrounding a portion of the pressure relief valve body 11c is the check valve portion of the check valve assembly 20. A check valve retainer 15 is coupled to the flange 11a of the pressure relief valve body 11c. The check valve retainer 15 has a series of openings 24 around an outer circumference of the retainer, with the openings 24 being in fluid communication with grooves 25 on a surface of the retainer 15 in the high pressure chamber 8. A check valve disk 17 is received between the retainer 15 and the flange 11a. A check valve spring 16 is present between the check valve disk 17 and the check valve retainer 15. The spring 16 has a first end 16a in contact with the check valve disk 17 and a second end 16b in contact with the check valve retainer 15. The check valve disk 17 is moveable between at least a first position and a second position by the spring 16. In the first position, the check valve disk 17 blocks the flow of fluid between the internal reservoir 6 and the high pressure chamber 8 through the passages 11b in the flange 11a and a second position in which fluid can flow between the internal reservoir 6 and the high pressure chamber 8 through the passages 11b of the flange 11a. The check valve disk 17 is preferably cup-shaped, although other shapes may also be used.

The check disk 17, spring 16, and the retainer 15 surround the pressure relief valve body 11c.

When pressure in the internal reservoir 6 is greater than the force of the check valve spring 16, the pressure of the internal reservoir 6 biases the check disk 17 against the check valve spring 16, allowing fluid from the internal reservoir 6 to flow into the high pressure chamber 8 through openings 24 and grooves 25 of the retainer 15.

Pressure in the high pressure chamber 8 may be relieved when the pressure in the high pressure chamber 8 is greater than the force of the pressure relief valve spring 13, moving the ball 12 away from the vent opening or seat 11d within the pressure relief valve body 11c.

Fluid from a supply flows from an inlet 5 to the inlet portion 23 of the bore 3a and to the inlet 4d of the hollow piston 4. The fluid fills the internal reservoir 6 of the hollow piston 4. When the fluid in the internal reservoir 6 is of a pressure which is greater than the force the check valve spring 16 exerts on the check disk 17, fluid flows through the through passage 11b and into the high pressure chamber 8. Backflow from the high pressure chamber 8 to the internal reservoir 6 is prevented by the cup-shaped check disk 17. Fluid from the internal reservoir 6 can enter the high pressure chamber 8 when the pressure in the high pressure chamber 8 falls due to extension of the piston 4 outwards from the housing 3 (increasing the volume of the high pressure chamber), sucking fluid into the high pressure chamber 8 from the internal reservoir 6 through the passage 11b of the check valve disk 17.

When the piston 4 is pushed towards the housing 3 from a pulse from the chain, the pressure in the high pressure chamber 8 increases such that the pressure is greater than the force of pressure relief spring 13, and the ball 12 of the pressure relief valve 11 unseats from the pressure relief valve body 11c and the pressure escapes through the opening 14a of the pressure relief valve retainer 14 of the pressure relief valve 11 to the internal reservoir 6.

By having a check valve assembly 20 of a check valve and pressure relief valve 11 present between the internal reservoir 6 and the high pressure chamber 8 formed at the closed end 21 of the bore 3a, the response time of the piston reaction force is improved increasing the oil inflow volume to the internal reservoir 6, reducing oil flow resistance as compared to a conventional ball inlet check valve. Additionally, problems such as oil deficiency into the high pressure chamber 8 under violent piston motion condition is prevented.

For example, when piston 4 moves with high frequency and amplitude, the high pressure chamber 8 requires a large volume of oil per unit time compared to other conditions, such as low frequency and small amplitude. During the high frequency and amplitude condition, the piston 4 within the high pressure chamber 8 is moved to an innermost position such that supply pressure for supply oil to the internal reservoir 6 to the high pressure chamber 8 declines. The check valve assembly of the present invention alleviates this problem by providing high oil inflow from the internal reservoir 6 to the high pressure chamber 8.

Figure 2:
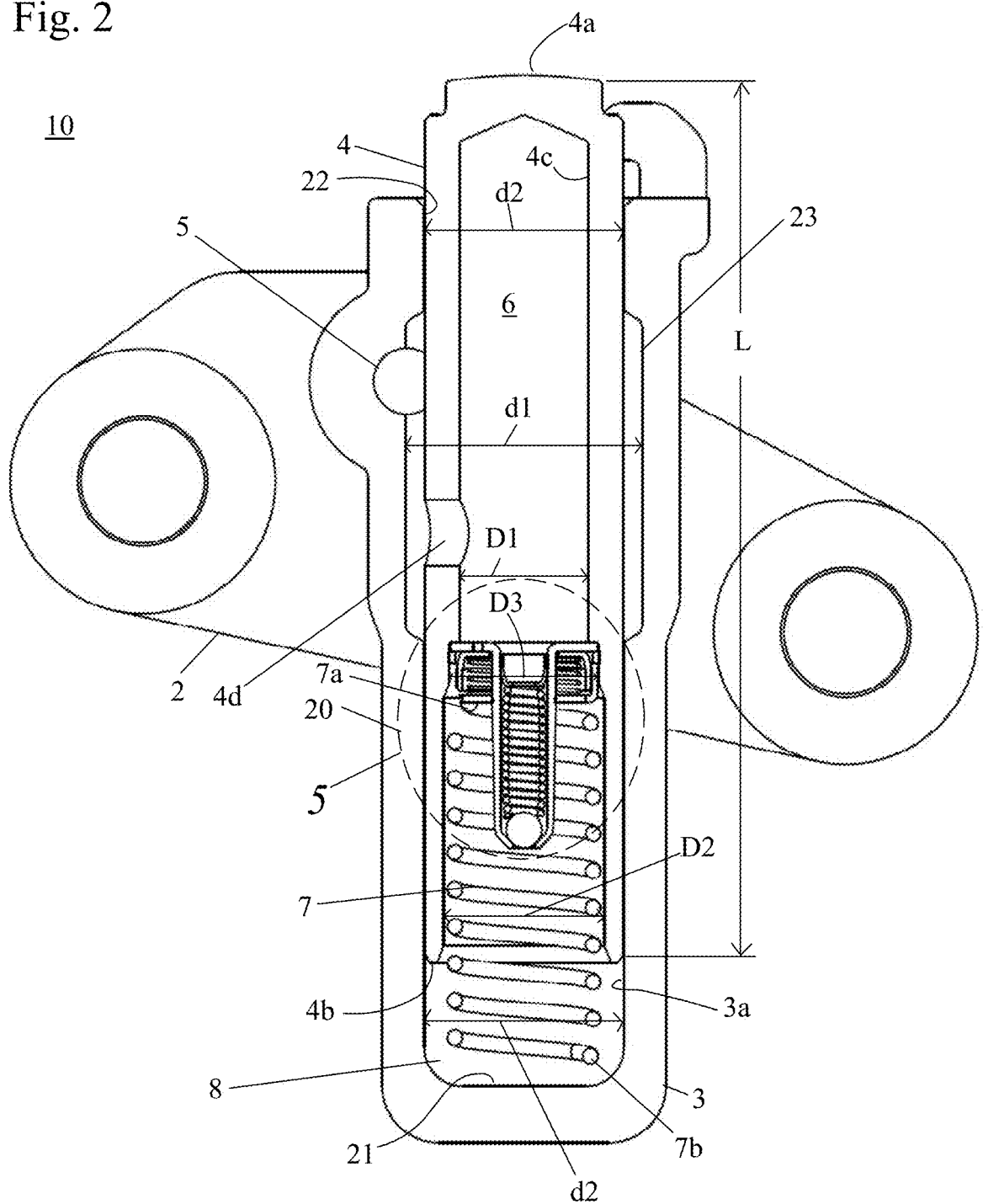
FIG. 2 shows a section of the hydraulic tensioner of FIG. 1 along line 2-2.
Figure 11:
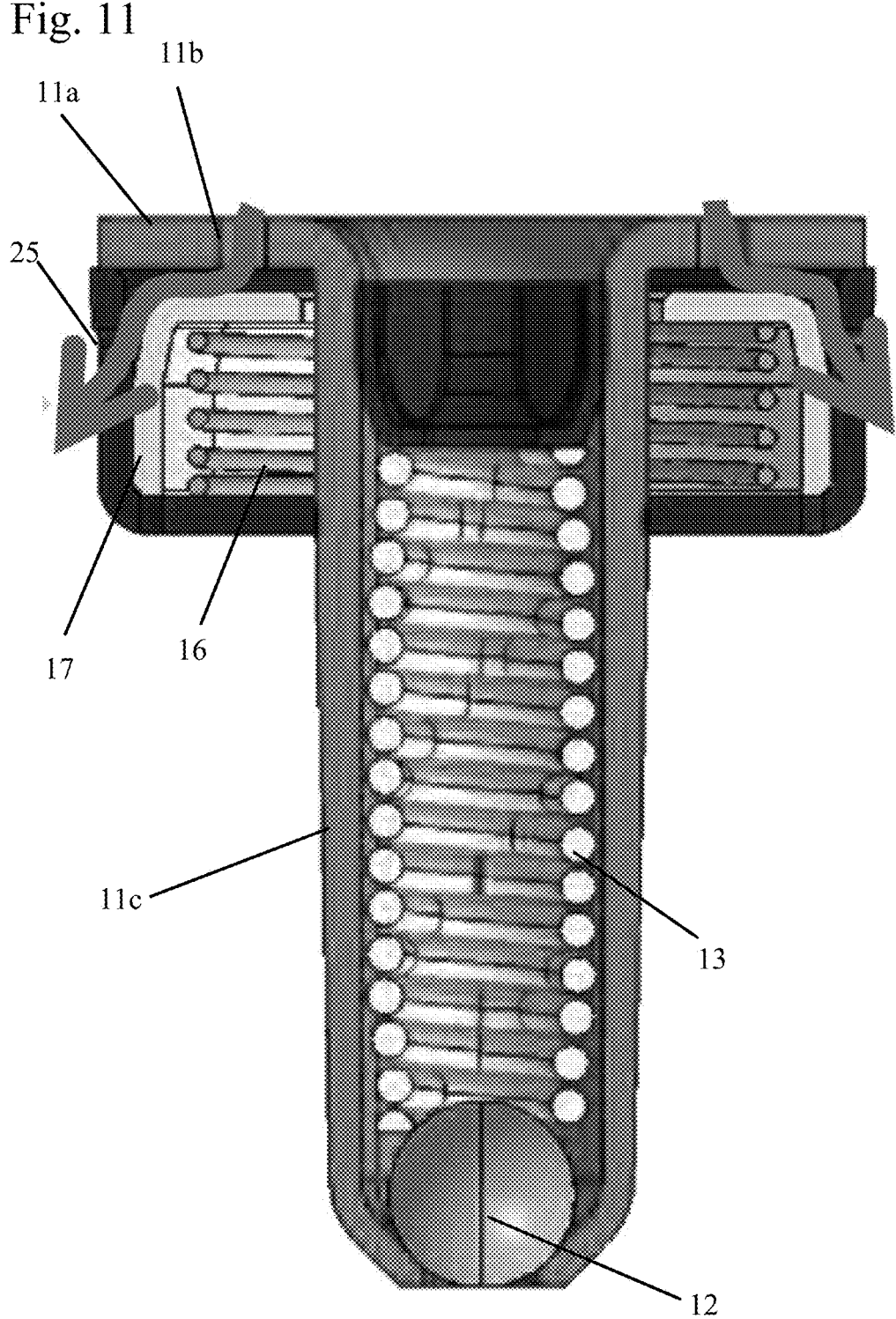
FIG. 11 shows a schematic of the oil flow through the check valve assembly of FIG. 2.

FIG. 11 shows the oil flow through the tensioner check valve assembly of FIG. 2. Due to the size of the openings 24 in the check valve retainer, a large flow of oil can flow from the internal reservoir 6 into the high pressure chamber 8.

Figure 12:
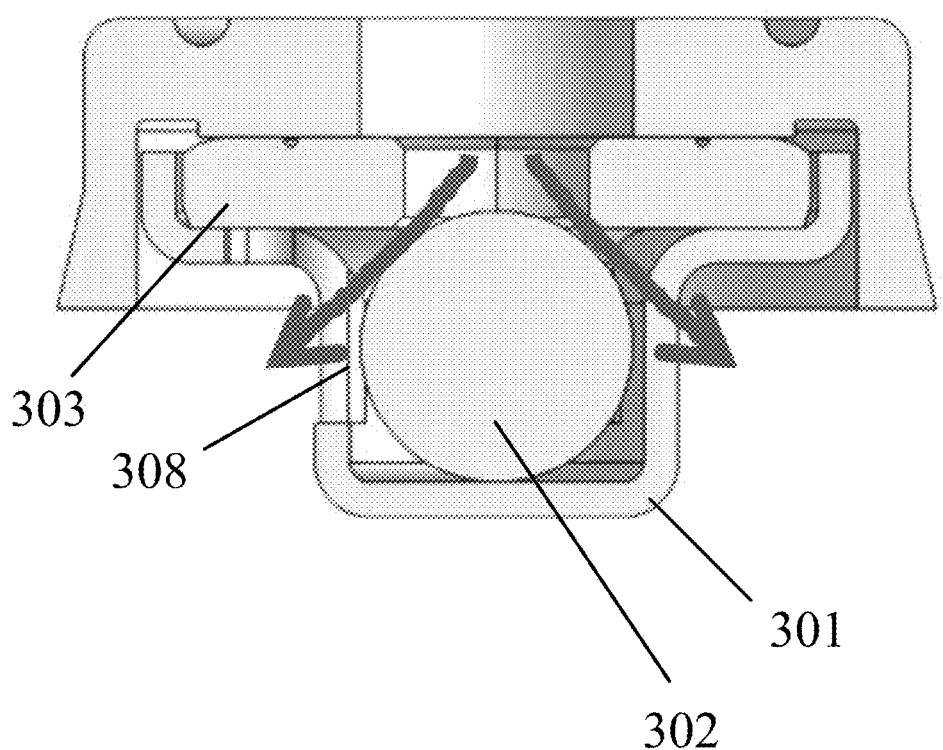
FIG. 12 shows a cross-section of a prior art ball check valve.

FIG. 12 shows a prior art ball check valve that is conventionally placed within a tensioner. The conventional ball check valve 300 includes a check valve retainer 301 which is coupled to a check valve seat 303. Within the check valve retainer 301 is received a ball 302. The check valve retainer 301 has openings 308. The amount of oil that flows through the conventional ball check valve per unit of time is significantly less than the oil that flows through the check valve assembly 20 of the present invention.

For example, under certain conditions, such as the prior art ball check valve and the check valve of the present invention being applied to the same piston, the check valve of the present invention has a 40% greater volume of flow than the conventional ball type check valve at 30 psi oil pressure condition.

Furthermore, the tensioner stiffness can easily be varied by changing the spring force of the check valve as well as the oil flow resistance through the check valve retainer 15. The oil flow resistance can be altered by altering the area size and length of the grooves 25 and the openings 24 of the check valve retainer 15.

Figure 3:
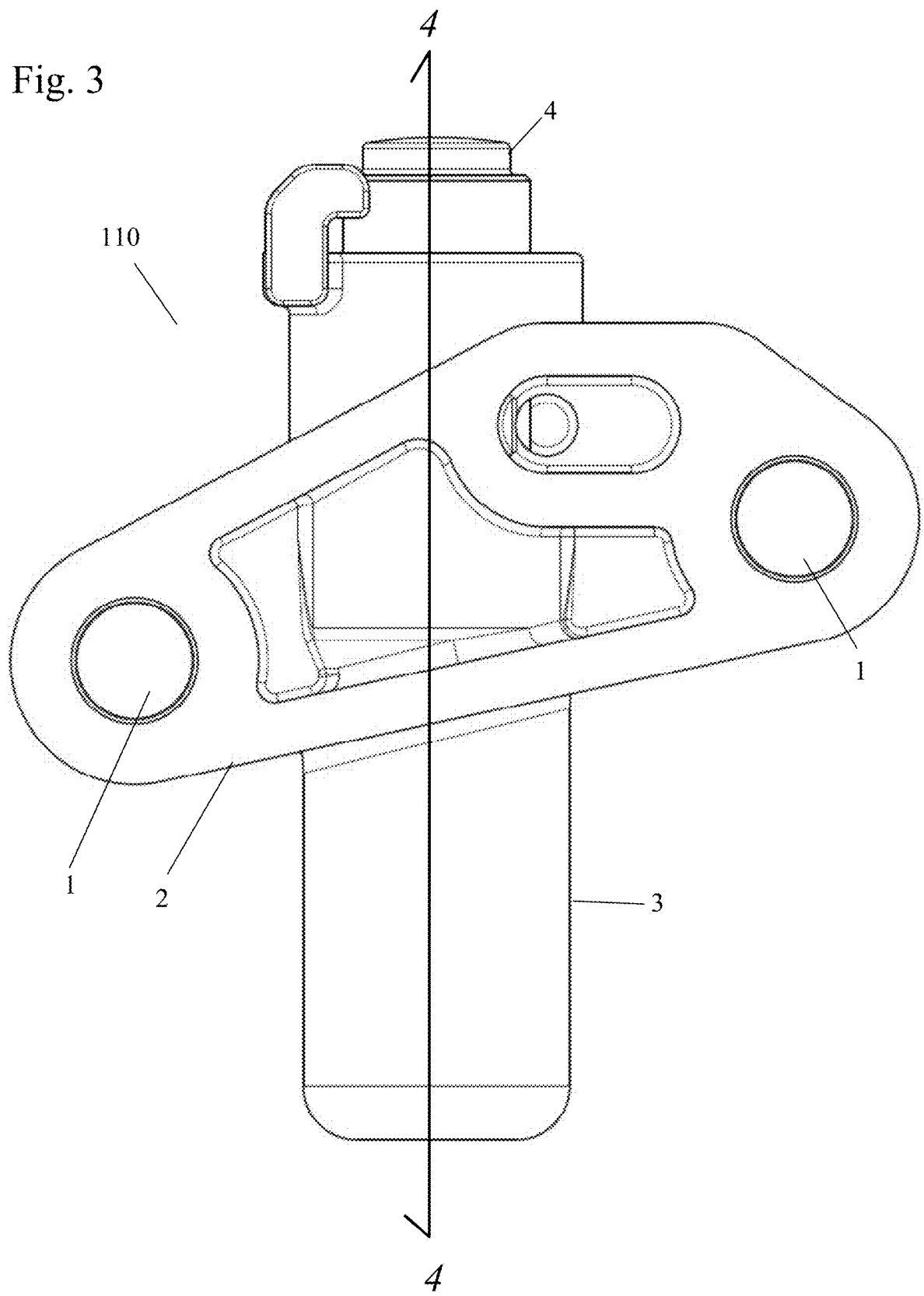
FIG. 3 shows a hydraulic tensioner of a second embodiment.
Figure 4:
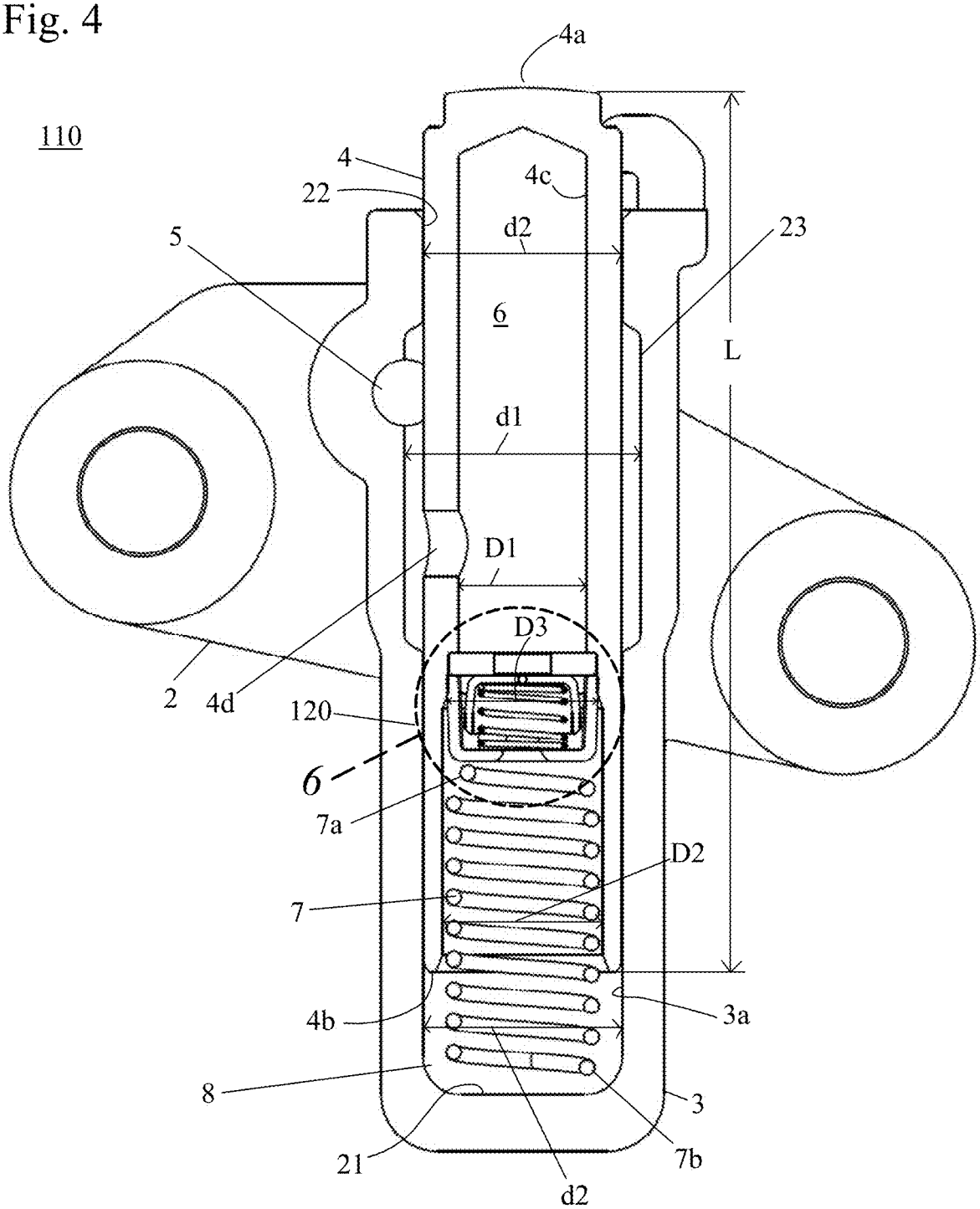
FIG. 4 shows a section of the hydraulic tensioner of FIG. 2 along line 4-4.
Figure 5:
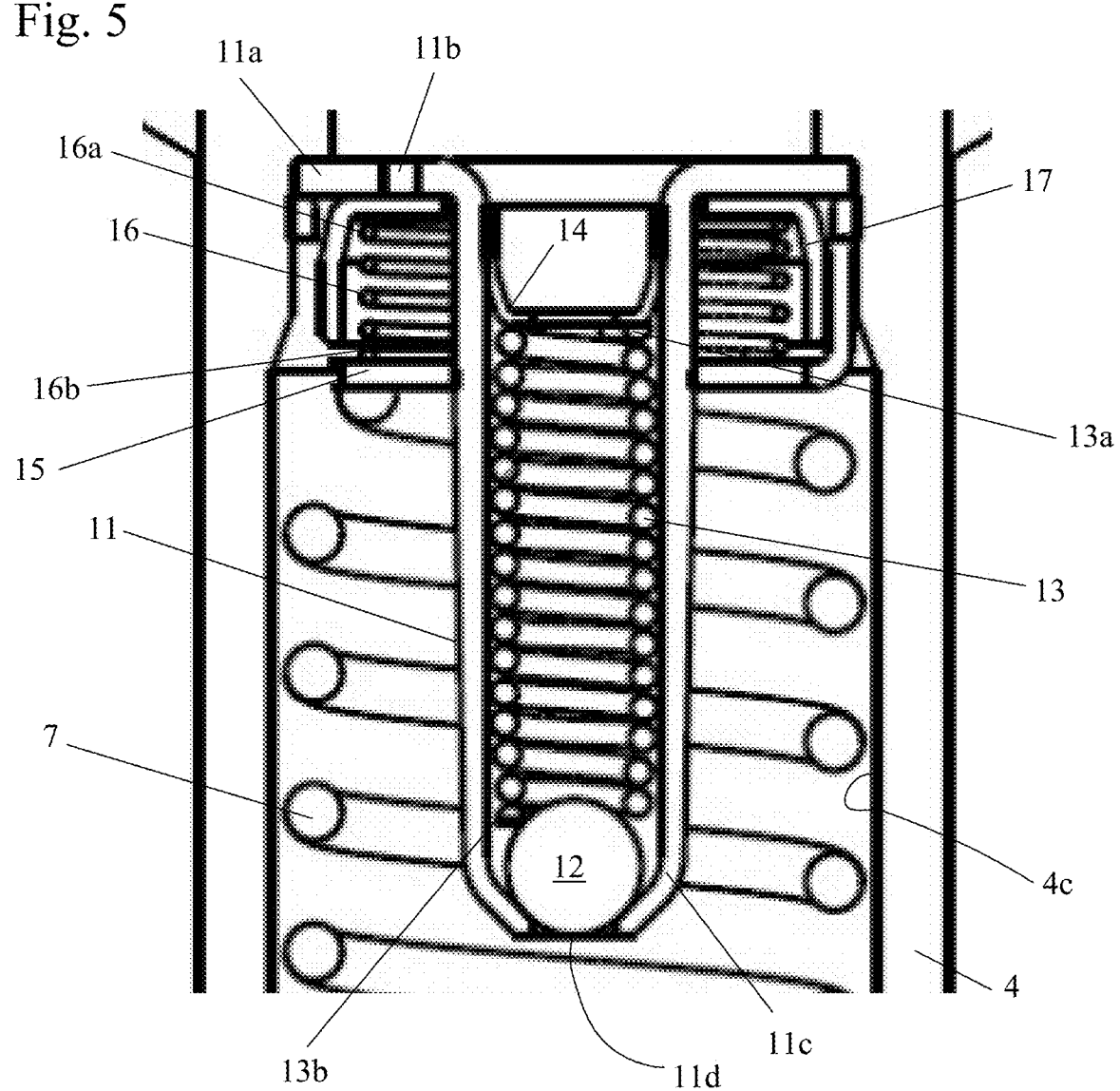
FIG. 5 shows a close-up view of the check valve assembly of FIG. 2.
Figure 6:
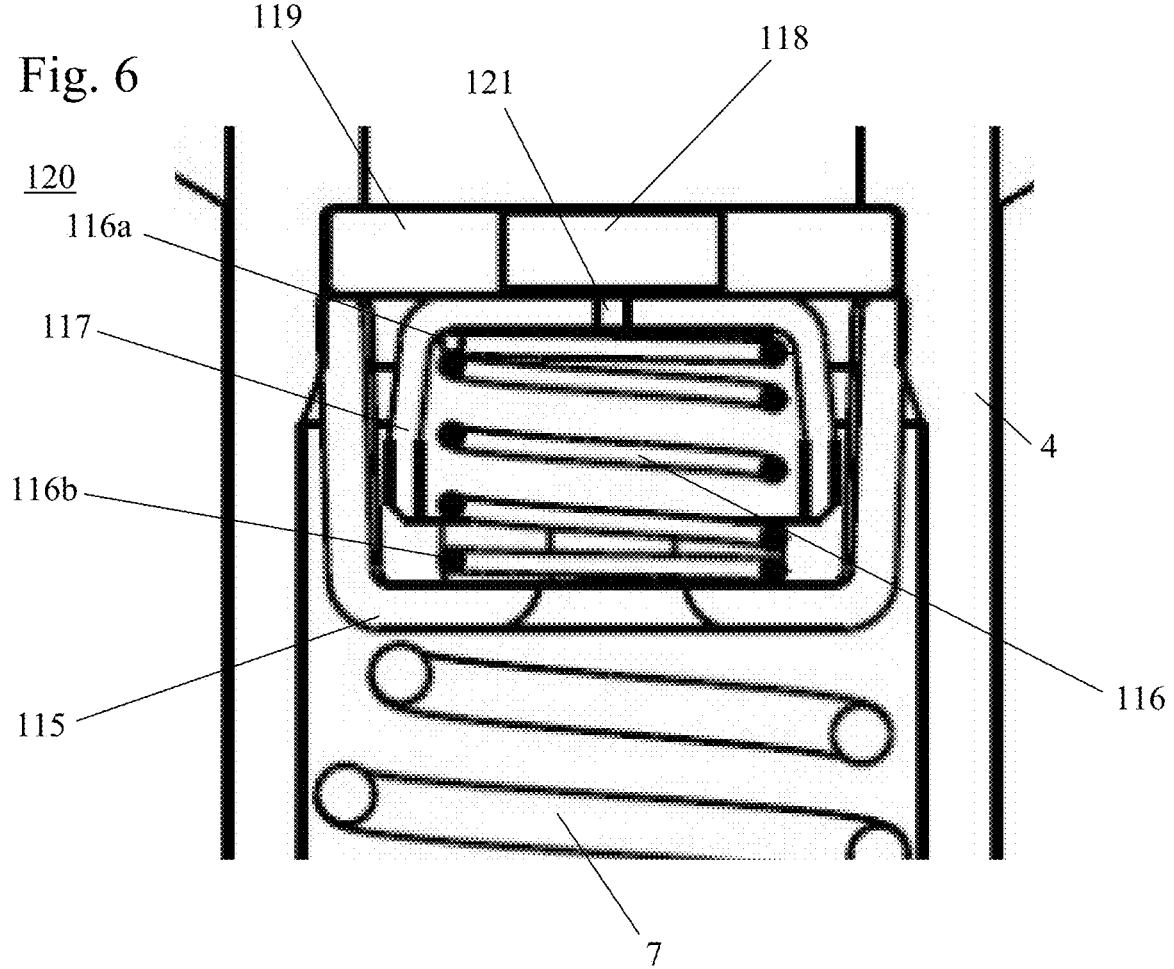
FIG. 6 shows a close-up view of the check valve assembly of FIG. 4.
Figure 7B:
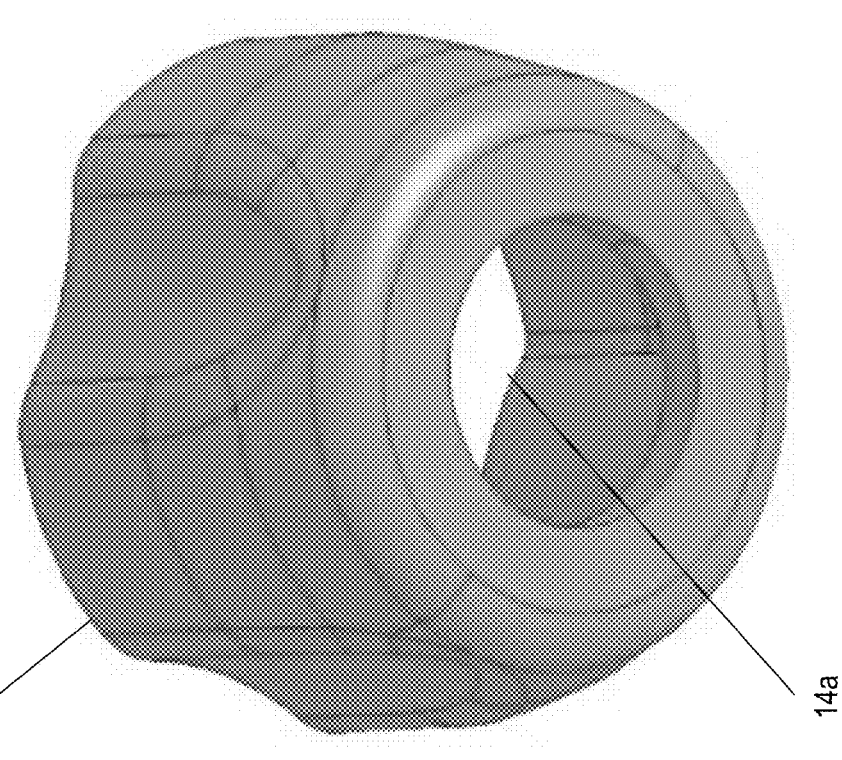
FIG. 7a-7b show different perspective views of the pressure relief valve retainer of the check valve assembly of FIG. 2.
Figure 7A:
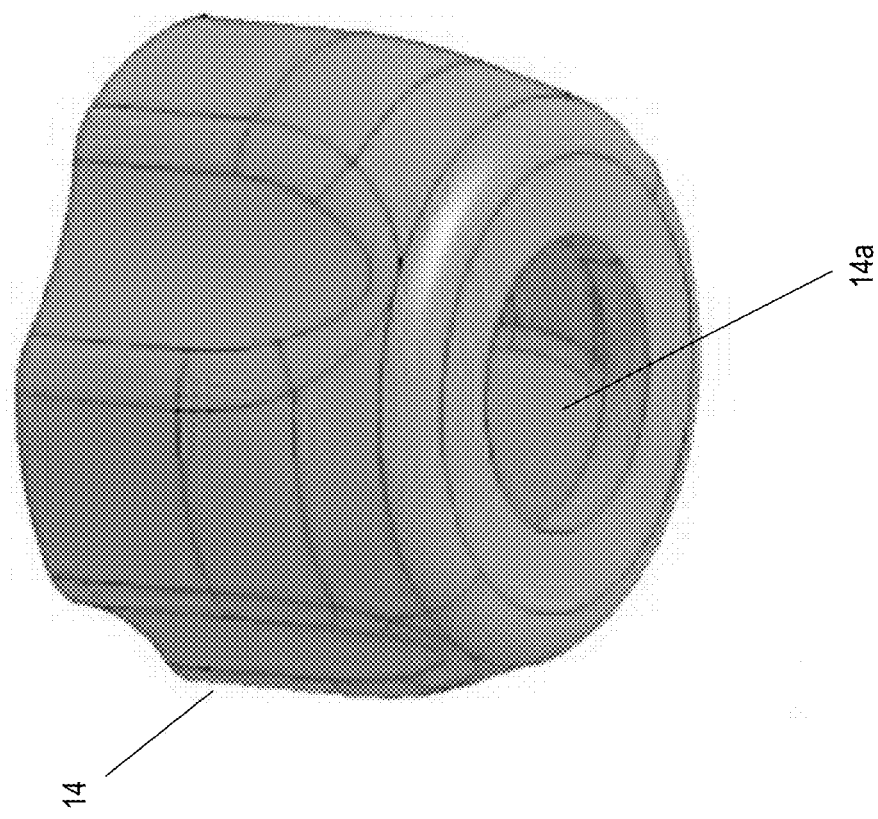
Figure 9:
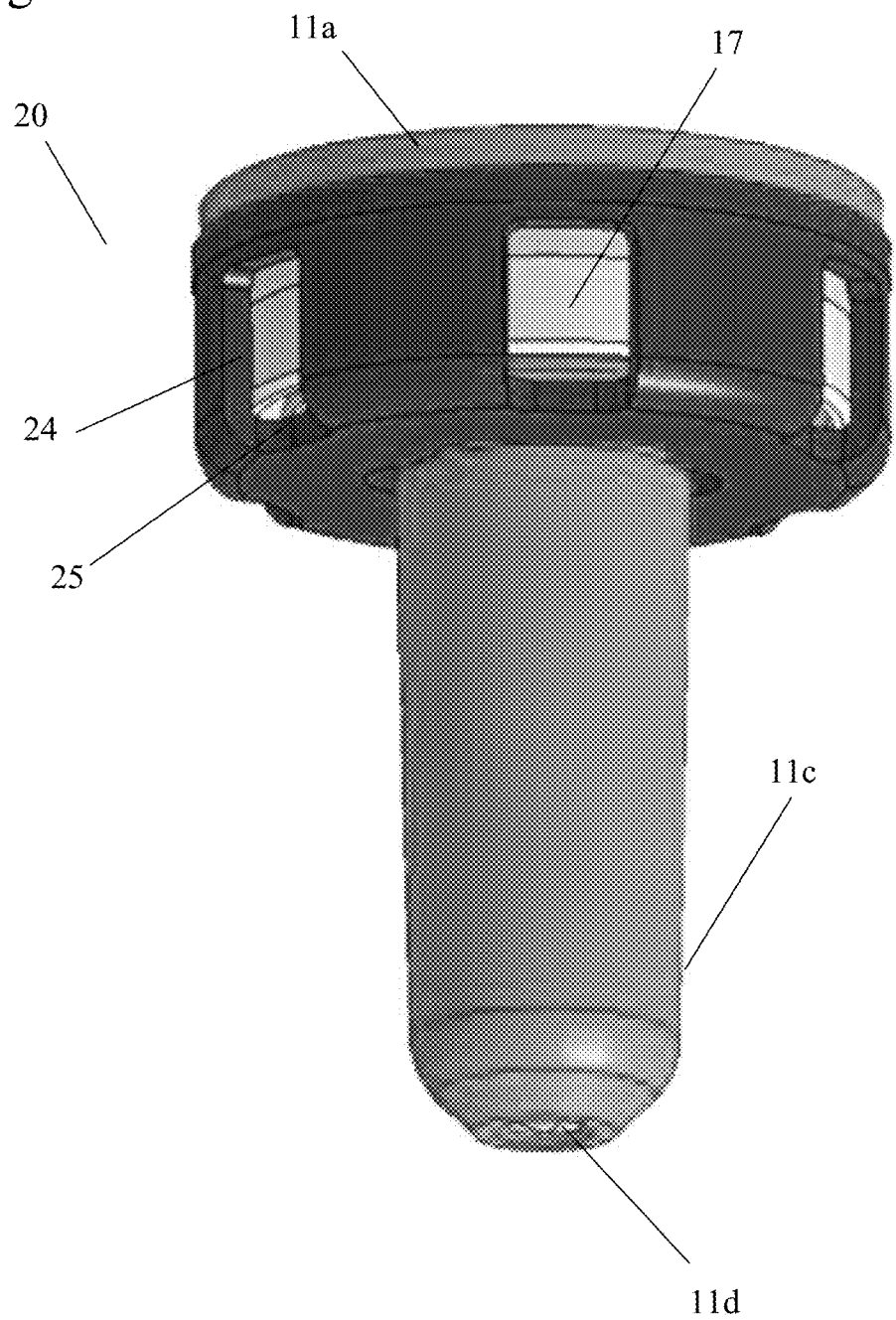
FIG. 9 shows the check valve assembly of FIG. 2.
Figure 10:
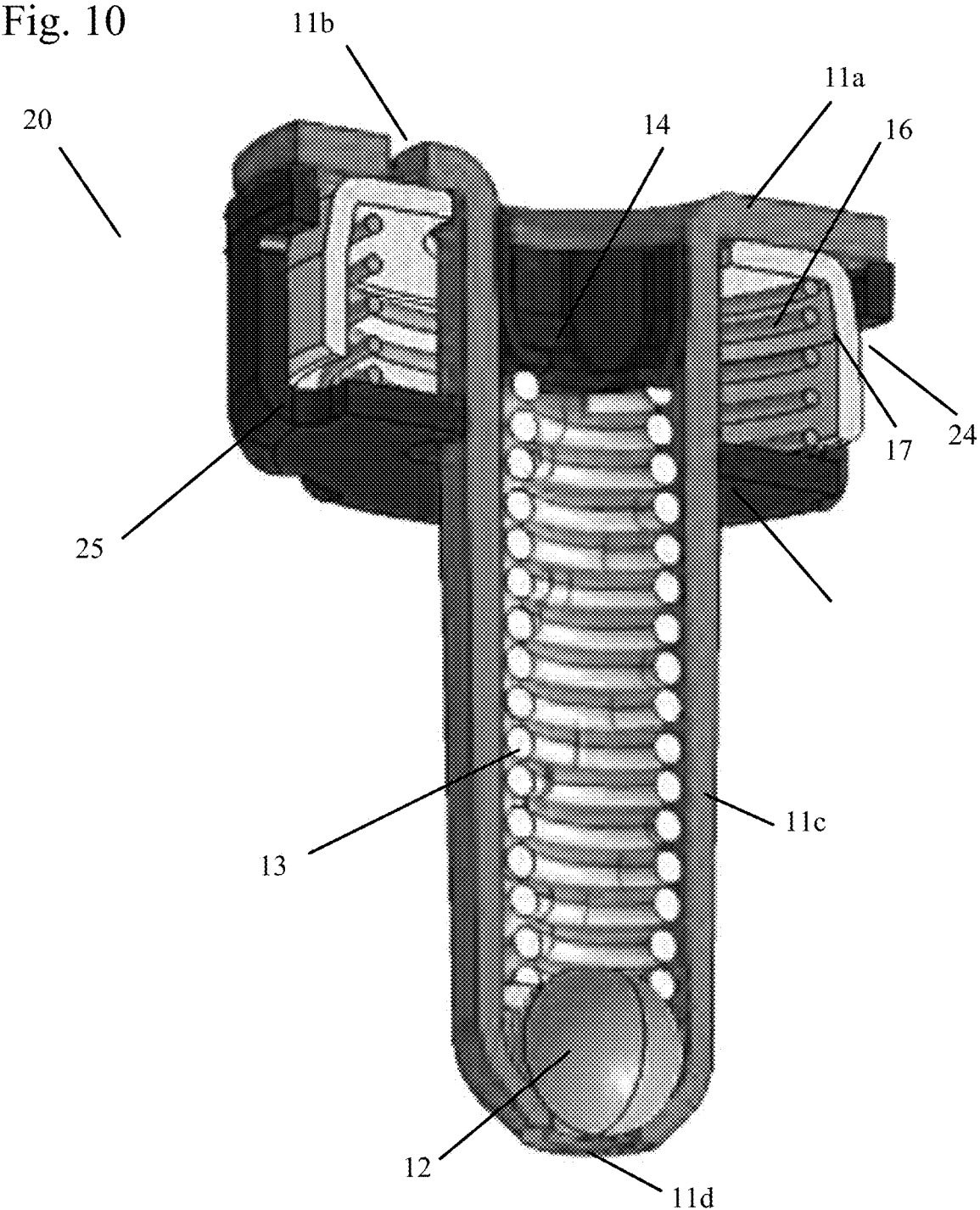
FIG. 10 shows a cross-sectional view of the check valve assembly of FIG. 9.

FIGS. 3-4 and 6 show a hydraulic tensioner 10 with an internal reservoir of a second embodiment is shown. The hydraulic tensioner is mounted to an engine block of an internal combustion engine (not shown) via a mounting plate 2. The mounting plate 2 is secured to the engine block (not shown) via bolts or screws received in mounting plate holes 1. The mounting plate 2 is coupled to or formed in part with a tensioner housing 3. The tensioner housing 3 has a closed end multi-staged internal bore 3a. Between the closed end 21 of the bore 3a and the open end 22 of the bore 3a is an inlet portion 23 of the bore 3a which has a diameter d1, which is greater than the diameter d2 of the bore 3a at the closed end 21 and the open end 22 of the bore. An oil inlet 5 is present in the inlet portion 23 of the bore 3a and is in fluid communication with a fluid supply (not shown).

A hollow piston 4 is slidably received within the bore 3a of the housing 3. The hollow piston 4 has a body with a first end 4a, a second end 4b, and a length L between the first end 4a and the second end 4b. The first end 4a of the hollow piston 4 is in contact with a tensioner body, guide or endless loop, flexible, power transmission member for an internal combustion engine. The second end 4b of the hollow piston 4 is received within the bore 3a of the tensioner housing 3.

The hollow piston 4 has an internal bore 4c. The internal bore 4c has a first diameter D1, a second diameter D2 and transition diameter D3 between the first diameter D1 and the second diameter D2. The first diameter D1 is preferably smaller than the second diameter D2. Along the length L of the hollow piston 4 is an inlet 4d which is in communication with the oil inlet 5.

A check valve assembly 120 is received within the transition diameter D3 of the internal bore 4c of the piston 4, dividing the internal bore 4c into an internal reservoir 6 and a high pressure chamber 8. The internal reservoir 6 is formed between the first diameter D1 of the internal bore 4c and the check valve assembly 120. The high pressure chamber 8 is formed between the check valve assembly 120, the second diameter D2 of the internal bore 4c of the piston 4, the second end 4b of the piston 4, and the closed end 21 of the bore 3a of the housing 3. A spring 7 is also preferably present within the high pressure chamber 8, with a first end 7a of the spring 7 biased against the check valve assembly 20 and the second end 7b of the spring 7 biased against the closed end 21 of the bore 3a of the housing 3, biasing the check valve assembly 120, and thus the piston 4 outwards and away from the closed end 21 of the bore 3a of the tensioner housing 3.

Within the internal bore 4c, a check valve assembly 120 is received within the transition diameter D3 and the second diameter D2 of the piston 4. Referring to FIG. 6, the check valve has a disk seat 119 with at least one passage 118 connecting the internal reservoir 6 with the high pressure chamber 8, a check valve retainer 115 coupled to the disk seat 119, a check valve disk 117 received between the retainer 115 and the disk seat 119, and a spring 116 between the check valve disk 117 and the retainer 115. The spring 116 has a first end 116a in contact with the disk seat 119 and a second end 116b in contact with the check valve disk 117. The check valve disk 117 is moveable between at least a first position and a second position by the spring 116. In the first position, the check valve disk 117 blocks the flow of fluid between the internal reservoir 6 and the high pressure chamber 8 through the at least one passage 118 and a second position in which fluid can flow between the internal reservoir 6 and the high pressure chamber 8 through the at least one passage 118. The check valve disk 117 is preferably cup-shaped, although other shapes may also be used.

When pressure in the internal reservoir 6 is greater than the force of the check valve spring 116, the pressure of the internal reservoir 6 biases the check disk 117 against the check valve spring 116, allowing fluid from the internal reservoir 6 to flow into the high pressure chamber 8.

Pressure in the high pressure chamber 8 may be relieved flowing through a small hole 121 in the cup shaped check valve disk 117 and to the passage 118 of the disk seat 119.

Fluid from a supply flows from an inlet 5 to the inlet portion 23 of the bore 3a and to the inlet 4d of the hollow piston 4. The fluid fills the internal reservoir 6 of the hollow piston 4. When the fluid in the internal reservoir 6 is of a pressure which is greater than the force the check valve spring 116 is exerting on the check disk 117, fluid flows through the through passage 118 and into the high pressure chamber 8. Backflow from the high pressure chamber 8 to the internal reservoir 6 is prevented by the cup-shaped check disk 117. Fluid from the internal reservoir 6 can enter the high pressure chamber 8 when the pressure in the high pressure chamber 8 falls due to extension of the piston 4 outwards from the housing 3 (increasing the volume of the high pressure chamber), sucking fluid into the high pressure chamber 8 from the internal reservoir 6 through the passage 118 by pushing up the check valve disk 117.

When the piston 4 is pushed towards the housing 3 from a pulse from the chain, the pressure in the high pressure chamber 8 increases such that the pressure is great enough to pass through a vent hole 121 of the check valve disk 117 to passage 118 leading to the internal reservoir 6.

By having a check valve assembly 120 present between the internal reservoir 6 and the high pressure chamber 8 formed at the closed end 21 of the bore 3a, the response time of the piston reaction force is improved increasing the oil inflow volume to the internal reservoir 6, reducing oil flow resistance as compared to a conventional ball inlet check valve. Additionally, problems such as oil deficiency into the high pressure chamber 8 under violent piston motion condition is prevented.

For example, when piston 4 moves with high frequency and amplitude, the high pressure chamber 8 requires a large volume of oil per unit time compared to other conditions, such as low frequency and small amplitude. During the high frequency and amplitude condition, the piston 4 within the high pressure chamber 8 is moved to an innermost position such that supply pressure for supply oil to the internal reservoir 6 to the high pressure chamber 8 declines. The check valve assembly of the present invention alleviates this problem by providing high oil inflow from the internal reservoir 6 to the high pressure chamber 8.

Furthermore, the tensioner stiffness can easily be varied by changing the oil flow resistance through the vent hole 121. The oil flow resistance can be altered by altering the area size and length of the vent hole 121.

The valve disk seat 119 may be fixed in place by press fitting the valve disk 119 within the piston 4. In an alternate embodiment, the valve disk seat 119 is set in the piston by a loose fit. In yet another embodiment, the valve disk seat 119 may be formed integrally with the piston 4.

In an alternate embodiment, the cupped shaped check disk 17, 117 and the check valve spring 16, 116 can be replaced with a band check valve of a coiled steel plate.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner for an internal combustion engine for tensioning a span of a chain or a belt comprising:
    a housing having a bore with a first open end in communication with a fluid input, and a second closed end;
    a hollow piston slidably received within the bore of the housing, the piston comprising a body having an open end and a closed end, a bottom surface at the open end, a top surface at the closed end, a fluid inlet between the open end and the closed end, and a hollow bore having at least a first inner diameter defining an internal reservoir in communication with the fluid input through the fluid inlet of the body of the piston and a second inner diameter;
    a hydraulic pressure chamber defined by the second inner diameter of the hollow bore of the body of the piston, and between the open end of the body of the piston and the second closed end of the bore of the housing;
    a piston spring received within the hydraulic pressure chamber for biasing the piston away from the second closed end of the bore of the housing;
    a check valve assembly received within the hollow bore of the body of the piston between the internal reservoir and the hydraulic pressure chamber, the check valve assembly comprising:
        a disk seat received within the hollow bore of the body of the piston having at least one passage connecting the internal reservoir to the hydraulic pressure chamber;
        a check valve retainer coupled to the disk seat;
        a check valve disk received between the disk seat and the check valve retainer moveable between a first position and a second position; and
        a check valve spring received between the check valve disk and the check valve retainer,
        wherein, in the first position, the check valve disk is biased against the disk seat by the check valve spring, sealing the at least one passage, preventing fluid from passing from the internal reservoir to the hydraulic pressure chamber and in the second position, the check valve disk is biased against the check valve spring, such that fluid can flow from the internal reservoir to the hydraulic pressure chamber through the at least one passage of the disk seat,
    wherein, when a dynamic load from the chain or belt moves the piston inwards and outwards from the housing, fluid from the internal reservoir is drawn into the hydraulic pressure chamber through the at least one passage of the disk seat of the check valve assembly, increasing the fluid pressure within the hydraulic pressure chamber, such that an outward force is exerted on the piston to oppose an inward force of the dynamic load from the chain or belt.

2. The hydraulic tensioner of claim 1, wherein the disk seat is formed in part by a flange connected to a pressure relief valve body defining a bore with an opening, the bore of the pressure relief valve body receiving a spring, a ball and a pressure relief valve retainer, wherein the spring is received within the pressure relief valve body between the ball seated within the opening of the bore of the pressure relief valve body, biasing the ball to seat in the opening of the bore of the pressure relief valve body.

3. The hydraulic tensioner of claim 1, wherein the check valve disk is cup shaped.

4. The hydraulic tensioner of claim 1, wherein the check valve disk further comprises a vent hole.

5. The hydraulic tensioner of claim 1, wherein the check valve retainer further comprises a passage for fluid to flow from the hydraulic pressure chamber to the internal reservoir.

6. The hydraulic tensioner of claim 1, further comprising a third diameter within the hollow bore of the body of the piston between the first diameter and the second diameter.

7. The hydraulic tensioner of claim 1, wherein the check valve retainer further comprises a series of openings on an outer circumference connected to grooves on the check valve retainer.

8. A hydraulic tensioner for an internal combustion engine for tensioning a span of chain or a belt comprising:
    a housing having a bore with a first open end in communication with a fluid input, and a second closed end;
    a hollow piston slidably received within the bore of the housing, the piston comprising a body having an open end and a closed end, a bottom surface at the open end, a top surface at the closed end, a fluid inlet between the open end and the closed end, and a hollow bore having at least a first inner diameter defining an internal reservoir in communication with the fluid input through the fluid inlet of the body of the piston and a second inner diameter;
    a hydraulic pressure chamber defined by the second inner diameter of the hollow bore of the body of the piston, and between the open end of the body of the piston and the second closed end of the bore of the housing;
    a piston spring received within the hydraulic pressure chamber for biasing the piston away from the second closed end of the bore of the housing; and
    a check valve assembly comprising:
        a disk seat received within the hollow bore of the body of the piston having at least one passage connecting the internal reservoir to the hydraulic pressure chamber;
        a check valve retainer coupled to the disk seat;
        a check valve disk received between the disk seat and the check valve retainer moveable between a first position and a second position, a check valve spring received between the check valve disk and the check valve retainer, wherein, in the first position, the check valve disk is biased against the disk seat by the check valve spring, sealing the at least one passage, preventing fluid from passing from the internal reservoir to the hydraulic pressure chamber and in the second position, the check valve disk is biased against the check valve spring, such that fluid can flow from the internal reservoir to the hydraulic pressure chamber through the at least one passage of the disk seat, wherein, the check valve assembly is disposed between the internal reservoir and the hydraulic pressure chamber, and when a dynamic load from the chain or belt moves the piston inwards and outwards from the housing, fluid from the internal reservoir is drawn into the hydraulic pressure chamber through the at least one passage of the disk seat of the check valve assembly, increasing the fluid pressure within the hydraulic pressure chamber, such that an outward force is exerted on the piston to oppose an inward force of the dynamic load from the chain or belt.

\* \* \* \* \*